May 19, 1931.  J. S. OECHSLE  1,805,704
TRACTOR SUPPORTING UNIT
Original Filed Aug. 29, 1923
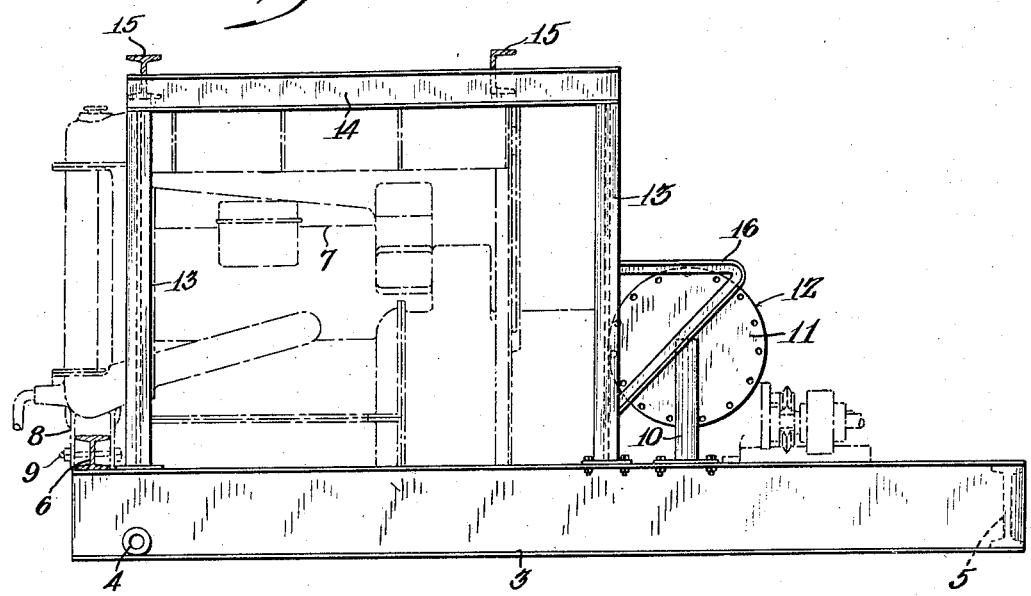
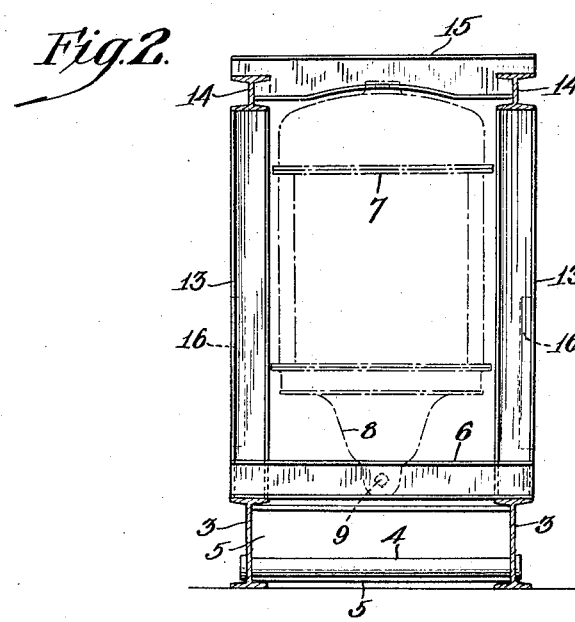
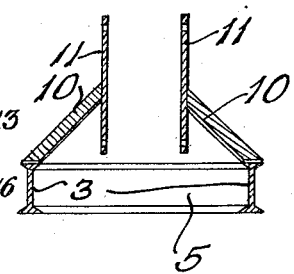
Inventor:
Joseph S. Oechsle
by Alfred T. Bratton
his Attorney Patented May 19, 1931

1,805,704

UNITED STATES PATENT OFFICE

JOSEPH S. OECHSLE, OF PHILADELPHIA, PENNSYLVANIA, ASSIGNOR TO METALWELD SERVICE CORPORATION, OF PHILADELPHIA, PENNSYLVANIA, A CORPORATION OF PENNSYLVANIA

TRACTOR SUPPORTING UNIT

Original application filed August 29, 1923, Serial No. 659,897. Divided and this application filed April 21, 1924. Serial No. 708,005.

The subject matter of this application is a divisional from my co-pending application, Serial Number 659,897, filed the 29th day of August, 1923, and it has reference to a novel type and method of supporting standard types of tractors whereby the same are adapted for other than their normally intended purpose.

Primarily this invention has been devised to afford a substantial structure whereon a tractor—with the steering and traction wheels removed therefrom—may be rigidly supported, with provision for coupling connection to—and operation of—a work unit, whereby the whole is rendered portable and compact for transportation.

More specifically, and as outlined in my above identified application, I aim to provide a unitary structure for supporting a portable welding unit, although it is to be clearly understood that the invention is in no sense limited to such embodiment.

Essentially my invention consists of a framework whereon a tractor may be rigidly mounted by clamping connection at the fore part and rear axle housing.

In the further disclosure of my invention reference will be made to the accompanying sheet of drawings, forming a part of this specification, and in which like characters designate the same parts in both views.

Figure 1—is a side view of my novel tractor supporting unit;

Figure 2—is a front end elevation of the same; and

Figure 3—is a transverse sectional view showing the relation between the bolting discs and the basal structure of the unit.

Referring more particularly to the drawings, I construct an enclosing framework comprising a basal structure of longitudinal I-beams 3, 3, rigidly secured in spaced relation by a transverse bolt or bolts 4, and a rear bracing member 5. Securely mounted transversely at the front end of the aforesaid basal structure is an I-beam or front suspension member 6, while other cross braces of a similar type—not shown—are arranged at intervals between the ends of the longitudinals 3, 3, where necessary, to ensure adequate support for the tractor—comprehensively designated by the numeral 7—and shown in dot-and-dash outline so as not to conflict with the subject matter of this case.

The tractor 7, is appropriately mounted in the aforesaid framework, at the frontal portion thereof, and while I have shown a Fordson tractor from which the usual axle housings have been removed, I do not limit myself to the supporting of such type of tractor. It is, however, to be particularly observed that the tractor 7 is connected by the front suspension 8 to the aforesaid transverse I-beam 6 through the medium of a bolt 9, while it is supportingly braced to the longitudinals 3, 3, by inclined struts 10 and integrally connected discs 11, adapted for bolting connection to the rear axle or differential housing 12, whereby said tractor is rigidly held in position and secure against displacement. It will be observed that the transversely connected longitudinal I-beams 3—3 comprise a unitary frame assembly which is disposed in a substantially horizontal plane and that the longitudinals of this assembly extend rearwardly of the tractor unit whereby to provide a support for a work utility, such as a compressor, not shown. It is preferable to provide a direct drive connection between the tractor transmission and this work unit and it will be observed that this is made possible in the arrangement herein shown and described by reason of the fact that the disc members 11, which are bolted to the rear axle or differential housing 12, are spaced laterally apart and in embracing relation with the shaft for transmitting power from the tractor transmission to the work unit.

Vertically disposed and integrally connected on the aforesaid basal structure are a plurality of columns 13, 13—conveniently of I-sections—on which are mounted similar section longitudinals 14, 14 and transverse members 15, 15 that constitute a superstructure for the support and housing of any desired source of power or other instrumentality, while angle brackets 16, 16 may be fitted to the rear columns 13, 13 to afford support for a storage or other utility.

Incidentally all the aforementioned structural elements may be integrally united as by welding, or they may be otherwise rigidly secured together as will be obvious to all acquainted with the art to which this invention appertains. However, what it is most desired to particularly stress is the manner and means by which I rigidly support a tractor 7, by the front suspension 8 and rear axle housing 12—with the steering and traction wheels removed—for service as a source of power to actuate or operate a connected work unit or other utility.

Although I have described one specific manner and structural embodiment of this invention, it is to be understood that the same is by way of example only; as various detail changes may be readily evolved without departing from the spirit and scope thereof, as particularly defined by the subjoined claims.

Having thus described my invention what I claim is:—

1. A supporting framework for use with a standard tractor comprising spaced longitudinals of standard I-sections and transverse bracings of like cross section, and angle struts with integrally connected disc members, said latter members being arranged for bolting connection to the rear axle housing of said tractor.

2. A supporting framework for use with a standard tractor comprising spaced longitudinals of standard I-sections and transverse bracings of like cross section, angle struts secured to and projecting upwardly and inwardly with respect to said longitudinals, and a pair of disc members integrally secured to the free ends of said struts, said members being connectable to opposite sides of the tractor differential housing and the aforesaid spaced lonigtudinals being rearwardly extended to afford foundation for a work unit operable by a direct drive from the tractor transmission.

In testimony whereof I affix my signature the 17th day of April, 1924.

JOSEPH S. OECHSLE.